United States Patent [19]
Gervis

[11] 3,834,352
[45] Sept. 10, 1974

[54] TRAVEL BIRD CAGE

[76] Inventor: Tillie Gervis, 4390 Collins Ave., Miami Beach, Fla. 33140

[22] Filed: Jan. 14, 1974

[21] Appl. No.: 433,276

[52] U.S. Cl. .................................. 119/17, 119/19
[51] Int. Cl. ............................................ A01k 31/00
[58] Field of Search ...................... 119/17, 19, 96

[56] References Cited
UNITED STATES PATENTS
3,352,287  11/1967  Klingberg ............................. 119/17
3,509,855   5/1970  Priddy, Jr. ............................ 119/19

Primary Examiner—Louis G. Mancene
Assistant Examiner—J. N. Eskovitz

[57] ABSTRACT

A bird cage for confining small birds during transportation of the birds from one place to another and consisting of a bottom half fabricated out of transparent rigid material provided with perforated ventilating openings throughout and having an entrance door in a side thereof and a clean out door in the bottom thereof, a top half manufactured of a fine mesh material which is affixed to the top edge of the bottom half, the top half provided with porch like extensions with at least one extension having an access door provided therein, and a pair of carrying handles affixed to opposite sides of the bottom half and projecting upwardly therefrom to a height above the top half and being manufactured of flexible material adapted to have the top portions thereof flexed together for ease of carrying in the hand of an individual when transporting the cage.

5 Claims, 5 Drawing Figures

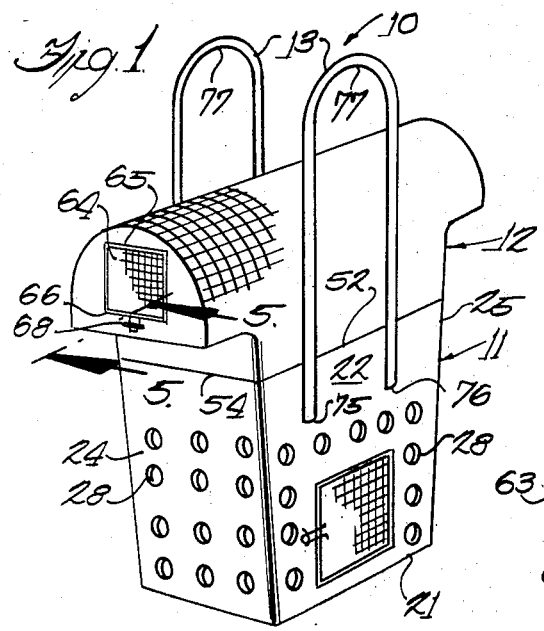
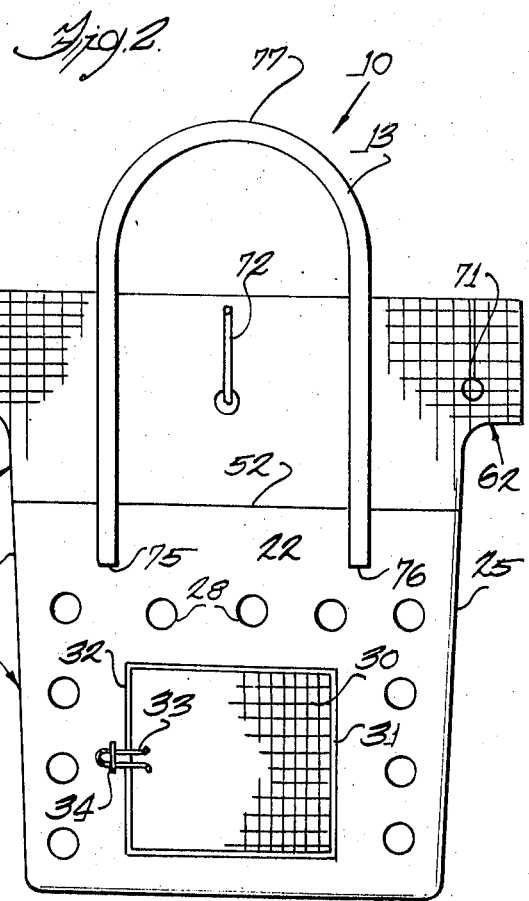
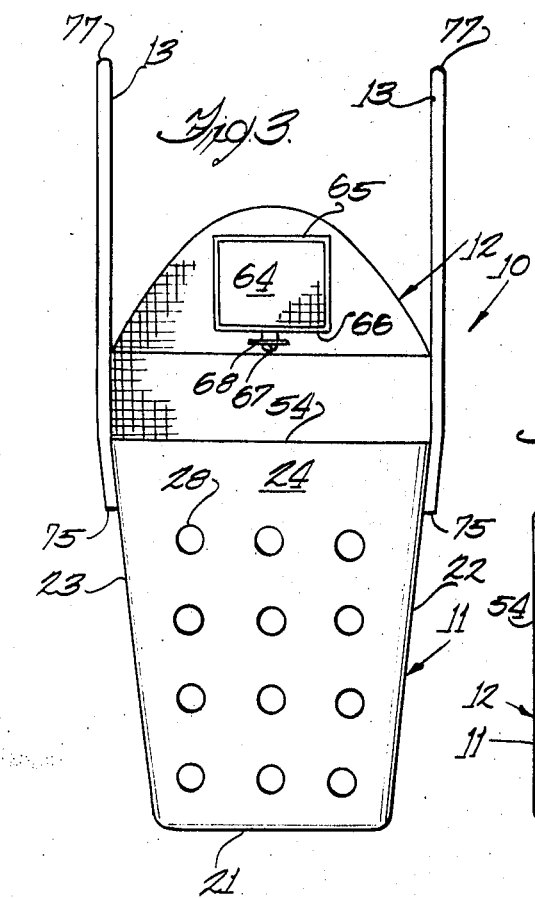
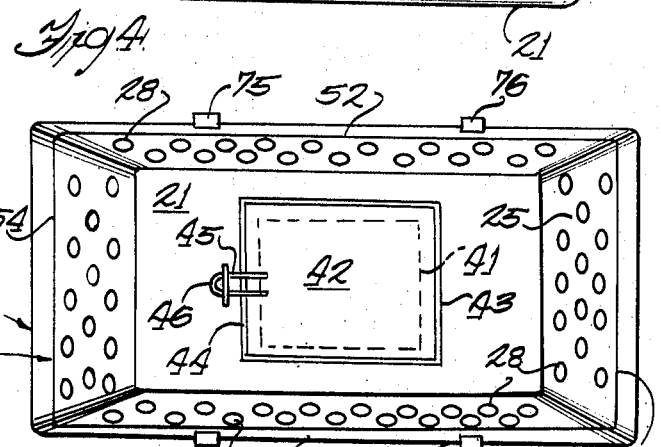
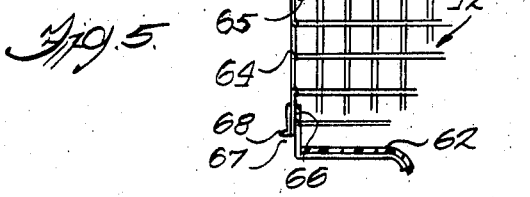

TRAVEL BIRD CAGE

BACKGROUND OF THE INVENTION

1. Field of the Invention

This invention relates generally to cages and more particularly to a novel travel bird cage providing comfort and convenience to a pet bird during transportation of the bird from one place to another while being convenient to the individual performing such transportation.

2. Description of the Prior Art

The appeal of birds as pets is constantly increasing in the country, with there being a need for a cage providing for transportation of such birds between locations without having to carry the large bulky permanent bird cage about and while yet providing comfort, convenience and security to the bird being transported.

It has been known in the prior art to provide bird cages of various types and configurations adapted for the transporting of birds, such cages being exemplified in U.S. Pat. Nos. 2,364,836; 2,845,895; 2,530,148; and 2,799,244. However, such prior art bird cages do not provide for the complete comfort and security to the bird but rather are only concerned with convenience to the individual doing the transporting of the bird such that a majority of bird owners have not purchased the same in view of their lack of appreciation for the comforts of the bird.

SUMMARY OF THE INVENTION

The present invention recognizes the deficiencies and disadvantages of presently available transporting bird cages and provides a novel solution to the problem of providing comport to the bird as well as convenience to the individual performing the transporting task by providing a bird cage having a rigid transparent ventilated bottom half and an open mesh top half with access doors provided throughout for ingress and egress of the cage for both the bird and cleaning purposes, and providing carrying handles conveniently used by an individual for conveniently transporting the cage.

It is a feature of the present invention to provide a convenient lightweight cage intended for use in the transporting of birds from one place to another without requiring bulky wire cages and the like.

A further feature of the present invention is to provide an improved bird cage.

Among further features and advantages of the present invention is the provision of a travel bird cage which is relatively simple in its construction and which therefore may be readily manufactured at a relatively low cost and by simple manufacturing methods; one which is possessed of few parts and which therefore is unlikely to get out of order; one which is of a rugged and durable construction; one which is easy to use and reliable and efficient in operation; one which is aesthetically pleasing and refined in appearance; one which may be retailed at a sufficiently low price to encourage its widespread use among bird owners for their pets; and one which is otherwise well adapted to perform the services required of it.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of a cage constructed in accordance with the present invention;

FIG. 2 is a front elevational view of the cage;

FIG. 3 is a side elevational view of the cage;

FIG. 4 is a bottom plan view of the cage; and

FIG. 5 is an enlarged cross-sectional view taken along Line 5—5 of FIG. 1.

DESCRIPTION OF THE PREFERRED EMBODIMENT

Referring now to the drawings in detail there is illustrated a preferred form of a bird cage intended for use in the transportation of a bird from one place to another and which is constructed in accordance with the principles of the present invention and which is designated generally in its entirety by the reference numeral 10 and which is comprised of a bottom half 11, a top half 12 affixed to the bottom half and projecting upwardly therefrom, and a pair of carrying handles 13.

The bottom half 11 is manufactured and fabricated out of any suitable rigid satisfactory material which is transparent and aesthetically pleasing and refined in appearance, the preferred embodiment being a high density transparent polyethylene plastic or polystyrene plastic. Further, it is envisioned within the scope of this invention that the bottom half may be of any desired cross-section configuration, such as oval and the like, with the drawings showing a generally rectangular configuration illustrating a preferred embodiment selected for ease of manufacturing purposes.

The bottom half 11 consists of a horizontal bottom surface 21, opposed front and back vertical wall surfaces 22 and 23, and opposed vertical side wall surfaces 24 and 25, these surfaces defining therebetween a hollow compartment for use by a bird being carried in the cage. The wall surfaces 22 – 25 are each provided with a plurality of ventilating openings 28 extending therethrough. Front wall surface 22 is provided with a rectangularly shaped opening therein which is covered by a fine mesh screen door 30 hinged at vertical frame member 31 to the front surface for pivotal movement thereabout between a position opening and closing the opening, with the opposite vertical frame member 32 having associated therewith a clip 33 projecting outwardly therefrom and adapted to be engaged in a holder 34 when the door is in the closed position for retaining the door in such position.

The bottom surface 21 is provided centrally thereof with a cleaning opening 41 which is closed by a solid door 42 hinged along edge 43 to the bottom surface and pivotable thereabout to provide ingress and egress of the bottom of the cage through opening 42, the edge 44 of the door provided with a latch 45 projecting outwardly therefrom and adapted to be engaged in retainer 46 for retaining the door in a closed position.

The surfaces 21 – 25 are of a rigid construction with wall surfaces 22 – 25 diverging upwardly and outwardly from associated edges of the bottom surface and terminating at top edges 52 – 55 respectively.

The top half 12 of cage 10 is manufactured and fabricated of a fine mesh material, such as wire mesh, vinyl mesh, and the like which is of a substantially rigid construction and which has a substantially semi-circular cross-section extending between top edges 52 and 53 with it being elongated along the longitudinal axis of the cage and provided with porch like extensions 61 and 62 at opposite ends thereof. Porch extension 61 is provided with a layer of transparent sheet material 62 over the bottom thereof, and is provided in end 63 thereof with an opening closable by screen door 64 hinged about a horizontal axis 65 for swinging movement thereabout to provide ingress and egress of the porch 61, the opposite edge 66 of the door provided with a latch 67 engagable in a retainer 68 for securing the door in a closed position.

The upper half 12 is provided inwardly thereof with a variety of perches 71 and swings 72 extending across the cage compartment area for use by the bird and which may be of various sizes and configurations as envisioned within the scope of the invention.

The handles 13 are each formed of a flexible strap like material which is folded over to define a general inverted U-shaped configuration having its opposite ends 75 and 76 bonded to the bottom half 11 of the cage and projecting upwardly therefrom with the bight portions 77 of each handle projecting above the top of cage top half 12. One of the handles is affixed to front wall 22 with the opposite handle being affixed to back wall 23. In use, an individual grips in one hand the bight portion 77 in a manner to pull the same together over cage top half portion 12 to provide for convenience in carrying of the cage.

There is thus provided a novel bird cage for use in traveling and otherwise transporting a pet bird from one place to another place with maximum comfort and security provided for the bird and convenience of carrying and usage provided to the individual as to ease of access to the interior of the cage for both handling of the bird and for cleaning the cage.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A bird cage adapted for transporting a bird from one place to another, the bird cage comprising a bottom half formed of rigid transparent material having a bottom surface and side wall surfaces depending upwardly therefrom and terminating in a top edge surrounding an interior compartment defined therein, a plurality of ventilating openings provided in said side wall surface, a clean out opening provided in said bottom surface of a sufficient size and configuration to permit an individual to pass a hand therethrough for access to the interior of said cage compartment, a door associated with said clean out opening and hinged to said bottom surface for selectively opening and closing said clean out opening, an access opening in a portion of said side wall surface, a door hingedly connected to said side wall surface and associated with said access opening for selectively opening and closing said access opening, a top half portion of said cage affixed to said top edges of said side wall surfaces to completely enclose the top end portion of said cage compartment, said top half portion consisting of a mesh screen type configuration projecting upwardly and over said bottom half portion, a porch like configuration formed integrally with said top half portion and projecting outwardly therefrom in a manner overlying said bottom half side wall surface, an opening in said porch enclosure providing access thereto, a screen door hingedly associated with said opening for selectively opening and closing the same, and a pair of substantially identical handle members each affixed at one end thereof to opposite portions of said bottom half side wall surface and each projecting upwardly therefrom to a position substantially above the top most portion of said top half portion of said cage, said handles adapted to be grasped in the hand of an individual for use in transporting the cage from one location to another location.

2. The bird cage as set forth in claim 1 wherein said bottom half portion is comprised of a substantially flat horizontal bottom surface, a front wall surface depending vertically upwardly from said bottom surface, a back wall surface depending vertically upwardly from said bottom surface, and a pair of opposed spaced apart side wall surfaces depending vertically upwardly from said bottom surface, said surfaces defining interiorly thereof said bottom half of said cage compartment, said front wall surface having said access opening provided therein with said door hingedly associated therewith, said door including a latch with said front surface including a retainer member with said latch adapted to engage said retainer member to retain said door in said closed position and permit selective opening of said door to provide access to said cage compartment, and said wall surfaces having a plurality of ventilating openings extending therethrough in communication with said cage compartment for providing ventilation thereto.

3. The bird cage as set forth in claim 2 wherein each of said handle members is of a substantially inverted U-shaped configuration having a bight portion extending above said cage top half portion and having the ends thereof permanently affixed to said bottom half portion, one of said handles associated with said front wall surface with the opposite of said handles aligned therewith and associated with said back wall surface, each of said handles being manufactured of a resilient material permitting said bight portions to be flexibly brought together for ease in carrying of a single hand of an individual.

4. The bird cage as set forth in claim 3 wherein said top half portion is comprised of a mesh body extending longitudinally between said side wall surfaces and having a semi-circular cross-section extending upwardly from said top edges of said front and back wall surfaces in a manner to overlie said bottom half cage compartment to completely enclose the top end thereof and define said top half cage compartment, said porch enclosure projecting outwardly from one end of said mesh body and formed integrally therewith and projecting over a side wall of said bottom half portion, said porch enclosure having an end wall, said opening provided in said end wall with said door hingedly associated therewith for controlling access thereto, said door having a latch adapted to engage a retaining member on said mesh end wall for detachably retaining said door in said closed position.

5. The bird cage as set forth in claim 4 wherein said porch enclosure further comprises a substantially horizontal mesh formed bottom surface extending between said porch enclosure end wall and an adjacent end wall of said mesh body portion, and a transparent sheet of plastic material resting on said porch enclosure bottom surface and extending from said porch enclosure end wall to said mesh body end wall.

* * * * *